UNITED STATES PATENT OFFICE 2,309,243

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application May 25, 1942, Serial No. 444,467

9 Claims. (Cl. 252—344)

This invention relates primarily to the treatment of emulsions of mineral oil and water, such as petroleum emulsions, for the purpose of separating the oil from the water.

One object of our invention is to provide a novel process for resolving petroleum emulsions of the water-in-oil type, that are commonly referred to as "cut oil," "roily oil," and "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum, and relatively soft waters or weak brines. Controlled emulsification and subsequent demulsification, under the conditions just mentioned, is of significant value in removing impurities, particularly inorganic salts from pipe line oil.

The demulsifying agents employed in the present process are obtained by splitting off one mole of water from the amides of hydroxymethyl aminomethane, such amides being characterized by the fact that the acyl radical is derived from a high molal detergent-forming monocarboxy acid.

The expression "detergent-forming monocarboxy acids" has been frequently employed in the literature to designate certain high molal acids having at least 8 and not more than 32 carbon atoms and characterized by the fact that they combine with alkali to form soap or soap-like materials. The commonest examples are higher fatty acids derived from animal, vegetable, or marine sources. Other well-known examples include resinic acids, such as abietic acid, naturally-occurring petroleum acids, such as naphthenic acids, oxidized petroleum acids, such as those obtained by the oxidation of petroleum hydrocarbons, waxes and the like, and from certain naturally-occurring waxes. Such monocarboxy detergent-forming acids may be cyclic or acyclic. They may be saturated or unsaturated. Included also are derivatives which do not eliminate the soap-forming property and which are obviously chemical equivalents of the unmodified acid. For instance, chlorinated oleic acid will serve as satisfactorily as oleic acid. Hydrogenated abietic acid is as satisfactory as the material prior to hydrogenation. Brominated naphthenic acid is as satisfactory as the naphthenic acid itself. This also applies to similar derivatives obtainable from oxidized petroleum acids, wax acids, etc.

It has been suggested that dehydration of such amides may be depicted by either one of the following reactions:

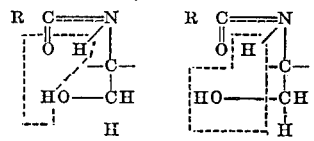

(For purposes of clarity, one carbon atom valency is incomplete.)

It is apparent that the final product produced is identically the same. Compare with an esterification reaction in which the reaction may be at least theoretically depicted involving either the carboxyl hydroxyl or the alcoholic hydroxyl. In the above illustrations the dotted line between the nitrogen atom and the carbon atom to the left thereof indicates the linkage formed when cyclization takes place. Actually, after ring closure takes place, the following nucleus is present:

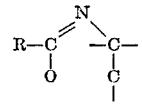

and the final mechanism in the above suggested reaction should show the linkage from the oxygen atom to both carbon atoms, and obviously, the double linkage of the carbonyl-oxygen-atom-carbon-atom becomes a single linkage. If, however, an effort were made to include such added structural changes in the above formulas, ensuing complications would probably defeat the intended purpose.

There is some question, and indeed considerable question, whether reaction is necessarily depicted in the above described manner. One objection to the previous suggestion is the following fact: If an amide be derived from ethylethanolamine, it would, in essence, conform to the above structural type, except that the aminohydrogen atom is replaced by an ethyl radical. Under such circumstances, if the amide were heated, one would expect to eliminate ethyl alcohol as readily, in all likelihood, as water is eliminated in the manufacture of the compounds herein contemplated as demulsifiers. Actually, no ethyl alcohol could be eliminated, although the amide was heated to a temperature of 320° C. Thus, at least, casting some doubt on the previous suggestion. This is based on actual experimentation.

Another suggestion has been that the reaction involves an alphahydrogen atom. If the high molal detergent-forming acid be depicted by the following formula:

RCOOH then the same acid can also be depicted by the following formula:

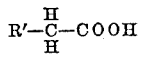

in which alphahydrogen atoms are depicted. A second suggestion has been that the elimination of a mole of water per mole of amide is due to the following formula:

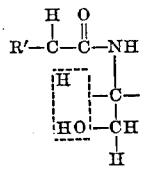

In this instance it is to be noted that the ring structure formed includes as a member of the nucleus a carbonyl-carbon atom. Such reaction would eliminate certain cyclic detergent-forming monocarboxy acids as suitable reactants.

We are aware that certain members of the genus herein contemplated as demulsifying agents are known. For instance, see U. S. Patent No. 2,215,038, dated September 17, 1940, to Hodgins and Hovey. Some of the steps herein described are boldly new. We are also aware that in addition to serving as demulsifying agents of the present process, the compounds herein contemplated may serve as intermediates for the preparation of a variety of chemical compounds, the bulk of which, or all of which are new, and all of which are effective as demulsifying agents and for other purposes, such as emulsifying agents. Reference is made to the fact that compounds of the type herein contemplated for use as a demulsifier, may serve as an intermediate for reactions involving inorganic acids, such as sulfuric acid and phosphoric acid; and organic acids, such as hydroxyacetic acid, polyhydroxyacetic acid, phthalic anhydride, maleic anhydride, succinic acid, sulfosuccinic acid, citraconic acid, adipic acid, etc. Such compounds may also be reacted with an alkylene oxide containing a reactive ethylene oxide ring, as, for example, ethylene oxide, propylene oxide, glycid, etc. The hydroxylated derivatives so obtained may be water-insoluble, or water-miscible, or water-soluble, and may, in turn, be subjected to analogous reactions with the inorganic acids and polybasic organic acids enumerated previously.

It is well-known that one can prepare amides of the kind described from monoethanolamine and other similar amines, such as monopropanolamine. The variety of amides thus obtainable is directly related to the available amines, which, in turn, are derived from certain olefine derivatives. For instance, the ordinary olefine has a characteristic ethylene linkage:

Conversion into the chlorhydrin results in compounds involving the following structure:

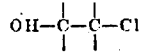

Reaction of the chlorhydrin with ammonia then results in the amine of the following structure:

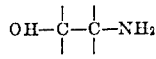

Such amine may be considered as hydroxymethyl aminomethane and substituents thereof, in which the hydrogen atoms attached to either carbon atom are replaced in the manner subsequently described:

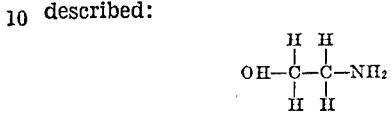

The conventional method for producing amides can be applied to the high molal acids previously described, or their obvious equivalents, for instance, the esters, anhydrides, etc., to give a variety of amides of the kind indicated by the following formulas:

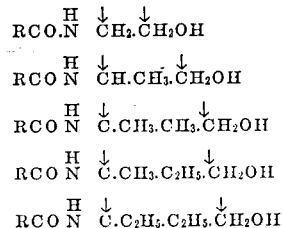

The small arrows indicate the adjacent carbon atoms, i. e., emphasize that the amides are derived from hydroxymethyl aminomethane. The same arrows will be used in subsequent formulas where it is convenient.

Some of the derivatives herein contemplated may be derived from beta glycerolchlorhydrin. This is depicted in the following formulas:

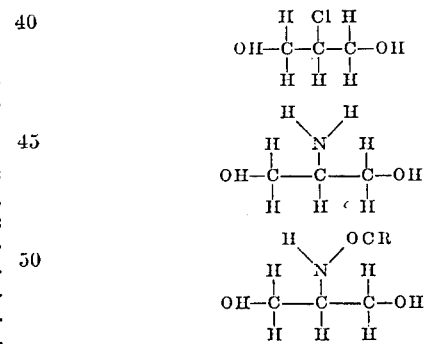

The structure of the last described compound is conveniently rearranged in the following form:

It is well-known that paraffins can be treated with nitric acid, so as to produce nitroparaffins or nitrites. Such nitroparaffins can be treated with aldehydes, particularly aliphatic aldehydes, having four carbon atoms or less, so as to produce nitroparaffins, in which one, two, or three hydroxyl alkyl radicals have been introduced, and particularly, characterized by the fact that such nitroparaffins may have two or three alkylol groups attached to the same carbon atom. Such nitroparaffins can readily be converted into the corresponding amine. See "Chemical Industries," volume 45, No. 7, pages 664–668, December, 1939. See also "Industrial and Engineering Chemistry," volume 32, No. 1, page 34.

Some known examples of amines of the kind described are:

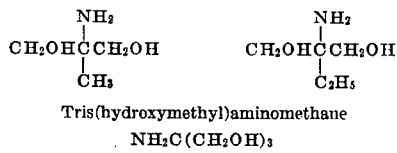

Tris(hydroxymethyl)aminomethane
NH₂C(CH₂OH)₃

Employing reactants of the kind above described, it is obvious that the following types of amides are readily obtainable:

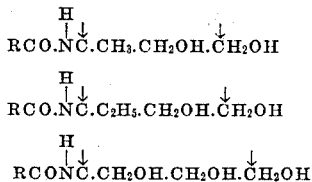

In view of what has been said, it hardly appears necessary to give any further directions as to the manufacture of the demulsifiers herein contemplated. All that one need to do, is to prepare the amides by conventional and well-known means, then heat the amides cautiously at a temperature approximating 180–200° C., up to 280° C. to slightly below the pyrolytic point until a mole of water, or substantially a mole of water, is eliminated. The pyrolytic point, of course, is the point at degradation or splitting of carbon-carbon linkages or carbon-nitrogen linkages as differentiated from the elimination of water.

We prefer to employ amides derived from fatty acids, and particularly, unsaturated fatty acids, and more especially, a hydroxylated unsaturated fatty acid, such as ricinoleic acid. We particularly prefer the type of dehydration product which contains at least one hydroxymethyl group, i. e., the type of amide illustrated by the last three formulas immediately preceding, i. e., amides obtained from 2-amino-2-methyl-1,3-propanediol, 2 - amino - 2 - ethyl-1,3-propanediol and tris(hydroxymethyl)aminomethane.

As pointed out, our preferred type of demulsifier is derived from unsaturated higher fatty acids, or higher fatty acid compounds. Such higher fatty acids include ricinoleic acid, oleic acid, linoleic acid, erucic acid, etc. One need not employ a single fatty acid, but may employ the naturally-occurring mixtures obtained by saponification or hydrolysis of naturally-occurring oils or fats, such as the mixed fatty acids derived from olive oil, teaseed oil, soybean oil, cottonseed oil, linseed oil, fish oils, etc. Castor oil, of course, may be used without saponification or hydrolysis. The unsaturated fatty acids may be monoethylenic, or polyethylenic.

*Example 1*

The amide derived by reaction between ricinoleic acid and 2-amino-2-methyl-1,3-propanediol is heated above 200° C. and below 300° C. for approximately three to twenty hours, until substantially a mole of water has been eliminated.

*Example 2*

The amide obtained by reaction between ricinoleic acid and 2-amino-2-ethyl-1,3-propanediol is subjected to the same treatment as in Example 1, preceding.

*Example 3*

The amide derived by reaction between ricinoleic acid and tris(hydroxymethyl)aminomethane is subjected to the same procedure as described in Example 1, preceding.

*Example 4*

The amide derived from oleic acid is substituted for the amide derived from ricinoleic acid in the three preceding examples.

*Example 5*

The mixture of conventional oxidized acids obtained from straight chain kerosenes is substituted for the amides derived from ricinoleic acid in Examples 1, 2 and 3, preceding.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well-known classes of demulsifying agents.

It is well-known that conventional demulsifying agents may be used in a water-soluble form, or in an oil-soluble form, or in a form exhibiting both oil and water-solubility. Sometimes they may be used in a form which exhibits relatively limited oil-solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifier of the kind above described is brought into contact with or caused to act upon the emulsion to be treated, in any of the various ways, or by any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

Attention is directed once more to the fact that the exact nature of the compounds herein employed as demulsifiers is not known. For this reason they are best referred to as the intra-molecular dehydration products of amides of hydroxymethyl aminomethanes, characterized by the fact that the acyl radical is derived from a detergent-forming monocarboxy acid having at least 8 carbon atoms and not more than 32 carbon atoms.

Having thus described our invention, what we claim as new and desire to secure by Letters Patent is:

1. A process for breaking petroleum emulsions of the water-in-oil type, characterized by subjecting the emulsion to the action of a demulsifying agent comprising an intra-molecular dehydration product of a hydroxymethyl aminomethane amide, said amide, prior to the elimination of a mole of water, containing the acyl radical of a detergent-forming monocarboxy acid having at least 8 carbon atoms and not more than 32 carbon atoms.

2. A process for breaking petroleum emulsions of the water-in-oil type, characterized by subjecting the emulsion to the action of a demulsifying agent comprising an intra-molecular dehydration product of a hydroxymethyl aminomethane amide, said amide, prior to the elimination of a mole of water, containing the acyl radical of a higher fatty acid having at least 8 and not more than 32 carbon atoms.

3. A process for breaking petroleum emulsions of the water-in-oil type, characterized by subjecting the emulsion to the action of a demulsifying agent comprising an intra-molecular dehydration product of a hydroxymethyl aminomethane amide, said amide, prior to the elimination of a mole of water, containing the acyl radical of an unsaturated higher fatty acid having at least 8 and not more than 32 carbon atoms.

4. A process for breaking petroleum emulsions of the water-in-oil type, characterized by subjecting the emulsion to the action of a demulsifying agent comprising an intra-molecular dehydration product of a hydroxymethyl aminomethane amide, said amide, prior to the elimination of a mole of water, containing the acyl radical of an unsaturated higher fatty acid having at least 8 and not more than 32 carbon atoms; such dehydration product having present at least one hydroxymethyl radical.

5. A process for breaking petroleum emulsions of the water-in-oil type, characterized by subjecting the emulsion to the action of a demulsifying agent comprising an intra-molecular dehydration product of a hydroxymethyl aminomethane amide, said amide, prior to the elimination of a mole of water, containing the acyl radical of an unsaturated higher fatty acid having 18 carbon atoms and said dehydration product containing at least one hydroxymethyl radical.

6. A process for breaking petroleum emulsions of the water-in-oil type, characterized by subjecting the emulsion to the action of a demulsifying agent comprising an intra-molecular dehydration product of a hydroxymethyl aminomethane amide, said amide, prior to the elimination of a mole of water, containing the ricinoleyl radical and said dehydration product containing at least one hydroxymethyl radical.

7. A process for breaking petroleum emulsions of the water-in-oil type, characterized by subjecting the emulsion to the action of a demulsifier comprising an intra-molecular dehydration product of the ricinoleic acid amide of 2-amino-2-methyl-1,3-propanediol.

8. A process for breaking petroleum emulsions of the water-in-oil type, characterized by subjecting the emulsion to the action of a demulsifier comprising an intra-molecular dehydration product of the ricinoleic acid amide of 2-amino-2-ethyl-1,3-propanediol.

9. A process for breaking petroleum emulsions of the water-in-oil type, characterized by subjecting the emulsion to the action of a demulsifier comprising an intra-molecular dehydration product of the ricinoleic acid amide of tris(hydroxymethyl) aminomethane.

MELVIN DE GROOTE.
BERNHARD KEISER.